(12) United States Patent
Cerny et al.

(10) Patent No.: US 9,575,620 B2
(45) Date of Patent: Feb. 21, 2017

(54) METHOD, APPARATUS AND COMPUTER PROGRAM PRODUCT FOR GRAPHICALLY ENHANCING THE USER INTERFACE OF A DEVICE

(71) Applicant: HERE Global B.V., Veldhoven (NL)

(72) Inventors: Karoline Cerny, Berlin (DE); Karen Janssen, Berlin (DE); Tanja Neubert, Berlin (DE); Elena Rovati, Berlin (DE)

(73) Assignee: HERE Global B.V., Veldhoven (NL)

( * ) Notice: Subject to any disclaimer, the term of this patent is extended or adjusted under 35 U.S.C. 154(b) by 198 days.

(21) Appl. No.: 13/904,714

(22) Filed: May 29, 2013

(65) Prior Publication Data

US 2014/0359520 A1 Dec. 4, 2014

(51) Int. Cl.
*G06F 3/0481* (2013.01)
*G06F 9/44* (2006.01)

(52) U.S. Cl.
CPC .......... *G06F 3/0481* (2013.01); *G06F 9/4443* (2013.01)

(58) Field of Classification Search
CPC .................................................. G06F 3/0481
USPC ......................................................... 715/781
See application file for complete search history.

(56) References Cited

U.S. PATENT DOCUMENTS

| | | | | |
|---|---|---|---|---|
| 6,628,996 B1 * | 9/2003 | Sezaki | ................. | G06F 3/0485 345/173 |
| 7,881,283 B2 * | 2/2011 | Cormier | ............ | H04M 1/72563 340/407.1 |
| 8,521,827 B2 * | 8/2013 | Martin | .................... | H04L 67/36 709/207 |
| 2001/0035882 A1 * | 11/2001 | Stoakley | ............... | G06F 3/0481 715/779 |
| 2003/0117440 A1 * | 6/2003 | Hellyar | ................. | G06F 3/0235 715/767 |
| 2006/0123353 A1 * | 6/2006 | Matthews | ............. | G06F 3/0482 715/779 |
| 2008/0155454 A1 * | 6/2008 | Balasubramanian | | G05B 23/0267 715/779 |
| 2010/0261458 A1 * | 10/2010 | Del Gallo | ............ | G06F 3/0317 455/414.1 |
| 2011/0080356 A1 * | 4/2011 | Kang | .................... | G06F 3/0486 345/173 |
| 2012/0304106 A1 | 11/2012 | Levee et al. | | |
| 2013/0038437 A1 * | 2/2013 | Talati | ..................... | B60K 35/00 340/438 |

(Continued)

OTHER PUBLICATIONS

OSX Dock—Feb. 2012.*

(Continued)

*Primary Examiner* — David Choi
(74) *Attorney, Agent, or Firm* — Alston & Bird LLP

(57) ABSTRACT

Provided herein is a method, apparatus and computer program product for presenting information relating to two or more applications on a partitioned display of a device. In particular, the method of example embodiments may include partitioning, by a processor, a display into a first region and a second region, where the first region is associated with a first application and the second region is associated with a second application. The method may further include providing for display of the first application across the first region and the second region, providing for display of a notification related to the first application in the first region, and providing for display of a notification related to the second application in the second region.

16 Claims, 12 Drawing Sheets

(56) References Cited

U.S. PATENT DOCUMENTS

| | | | | |
|---|---|---|---|---|
| 2013/0332855 A1* | 12/2013 | Roman | ................ | G06F 3/0481 |
| | | | | 715/753 |
| 2014/0282233 A1* | 9/2014 | Sandler | ................ | G06F 3/0484 |
| | | | | 715/800 |
| 2014/0359520 A1* | 12/2014 | Cerny | .................. | G06F 9/4443 |
| | | | | 715/781 |

OTHER PUBLICATIONS

How to Get the OS X Dock on iPhone—Feb. 27, 2013.*
International Search Report and Written Opinion from International Application No. PCT/EP2014/060762, dated Aug. 11, 2014.

* cited by examiner

US 9,575,620 B2

METHOD, APPARATUS AND COMPUTER PROGRAM PRODUCT FOR GRAPHICALLY ENHANCING THE USER INTERFACE OF A DEVICE

TECHNOLOGICAL FIELD

Example embodiments of the present invention relate generally to the presentation of information on a display, and more particularly, to the display of an increased level of information associated with a variety of applications of a device, while visually distinguishing the source application of the displayed information.

BACKGROUND

The modern communications era has brought about a tremendous expansion of wireline and wireless networks. Computer networks, television networks, and telephone networks are experiencing an unprecedented technological expansion, fueled by consumer demand. Wireless and mobile networking technologies have addressed consumer demands while providing more flexibility and immediacy of information transfer.

Mobile devices, such as cellular telephones, have become smaller and lighter while also becoming more capable of performing tasks that far exceed a traditional voice call. Mobile devices are becoming small, portable computing devices that are capable of running a variety of applications, some of which benefit from a larger display. These devices are comparable in capabilities to laptop or desktop-type computers such that they can execute thousands of available applications. The portability of such devices may be enhanced by reducing their size, and hence, their display size. With limited display size, and the ability of devices to run applications simultaneously, creative use of the display may be desirable to enhance the user experience.

SUMMARY

In general, an example embodiment of the present invention provides an improved method of presenting information relating to two or more applications on the display of a device. In particular, the method of example embodiments may include partitioning, by a processor, a display into a first region and a second region, where the first region is associated with a first application and the second region is associated with a second application. The method may further include providing for display of the first application across the first region and the second region, providing for display of a notification related to the first application in the first region, and providing for display of a notification related to the second application in the second region. Providing for display of the first application across the first region and the second region may be performed in response to receiving a selection of the first application as a primary application. Providing for display of a notification related to the second application in the second region includes providing for display of a notification to appear superimposed over the primary application in the second region.

Methods according to example embodiments may further include providing for display of an indication of an identity related to the first application in the first region, and providing for display of an indication of an identity related to the second application in the second region. The indication of the identity of the second application in the second region may be replaced by a notification related to the second application in response to providing for display of the notification related to the second application. Methods may also include providing for display of the second application across the first region and the second region in response to the second application being selected as a primary application. The first region may be associated with the first application and a plurality of other applications different from the second application, and the method may include providing for display of a notification related to one of the plurality of other applications in the first region.

Example embodiments of the invention may provide an apparatus including at least one processor and at least one memory including computer program code. The at least one memory and the computer program code are configured to, with the at least one processor, cause the apparatus to partition a display into a first region and a second region, where the first region is associated with a first application and the second region is associated with a second application. The apparatus may be caused to provide for display of the first application across the first region and the second region, provide for display of a notification related to the first application in the first region, and provide for display of a notification related to the second application in the second region. Causing the apparatus to provide for display of the first application across the first region and the second region may be performed in response to receiving a selection of the first application as the primary application. Causing the apparatus to provide for display of a notification related to the second application in the second region may include causing the apparatus to provide for display of a notification to appear superimposed over the primary application in the second region.

An apparatus according to some example embodiments may further be caused to provide for display of an indication of an identity related to the first application in the first region and provide for display of an indication of an identity related to the second application in the second region. The indication of the identity of the second application in the second region may be replaced by a notification related to the second application in response to the apparatus being caused to provide for display of the notification related to the second application. An apparatus of example embodiments may further be caused to provide for display of the second application across the first region and the second region in response to the second application being selected as a primary application. The first region may be associated with the first application and a plurality of other applications different from the second application, where the apparatus may further be caused to provide for display of a notification related to one of the plurality of other applications in the first region.

Embodiments of the present invention may provide a computer program product including at least one non-transitory, computer-readable storage medium having computer executable program code instructions stored therein. The computer executable program code instructions may include program code instructions to partition a display into a first region and a second region, where the first region is associated with a first application and the second region is associated with a second application. The computer program product may also include program code instructions to provide for display of the first application across the first region and the second region, program code instructions to provide for display of a notification related to the first application in the first region, and program code instructions to provide for display of a notification related to the second application in the second region. The program code instructions to provide for display of the first application across the first region and the second region may be executed in response to receiving a selection of the first application as a primary application.

Computer program products according to some example embodiments may further include program code instructions to provide for display of an indication of an identity related to the first application in the first region, and program code instructions to provide for display of an indication of an identity related to the second application in the second region. The computer program product may further include computer program code to replace the indication of the identity of the second application with a notification related to the second application in response to the execution of the program code instructions to provide for display of a notification related to the second application. Computer program products according to some example embodiments may include program code instructions to provide for display of the second application across the first region and the second region in response to the second application being selected as the primary application. The first region may be associated with the first application and a plurality of other applications different from the second application, where the computer program product may further include program code instructions to provide for display of a notification related to one of the plurality of other applications in the first region.

Example embodiments of the invention may provide an apparatus including means for partitioning a display into a first region and a second region, where the first region is associated with a first application and the second region is associated with a second application. The apparatus may further include means for providing for display of the first application across the first region and the second region, means for providing for display of a notification related to the first application in the first region, and means for providing for display of a notification related to the second application in the second region. The means for providing for display of the first application across the first region and the second region may be performed in response to receiving a selection of the first application as the primary application. The means for providing for display of a notification related to the second application in the second region may include means for providing for display of a notification to appear superimposed over the primary application in the second region.

An apparatus according to some example embodiments may further include means for providing for display of an indication of an identity related to the first application in the first region and means for providing for display of an indication of an identity related to the second application in the second region. The indication of the identity of the second application in the second region may be replaced by a notification related to the second application in response to the apparatus being caused to provide for display of the notification related to the second application. An apparatus of example embodiments may further include means for providing for display of the second application across the first region and the second region in response to the second application being selected as a primary application. The first region may be associated with the first application and a plurality of other applications different from the second application, where the apparatus may further include means for providing for display of a notification related to one of the plurality of other applications in the first region.

DRAWINGS

Having thus described embodiments of the invention in general terms, reference will now be made to the accompanying drawings, which are not necessarily drawn to scale, and wherein:

Figure 11:
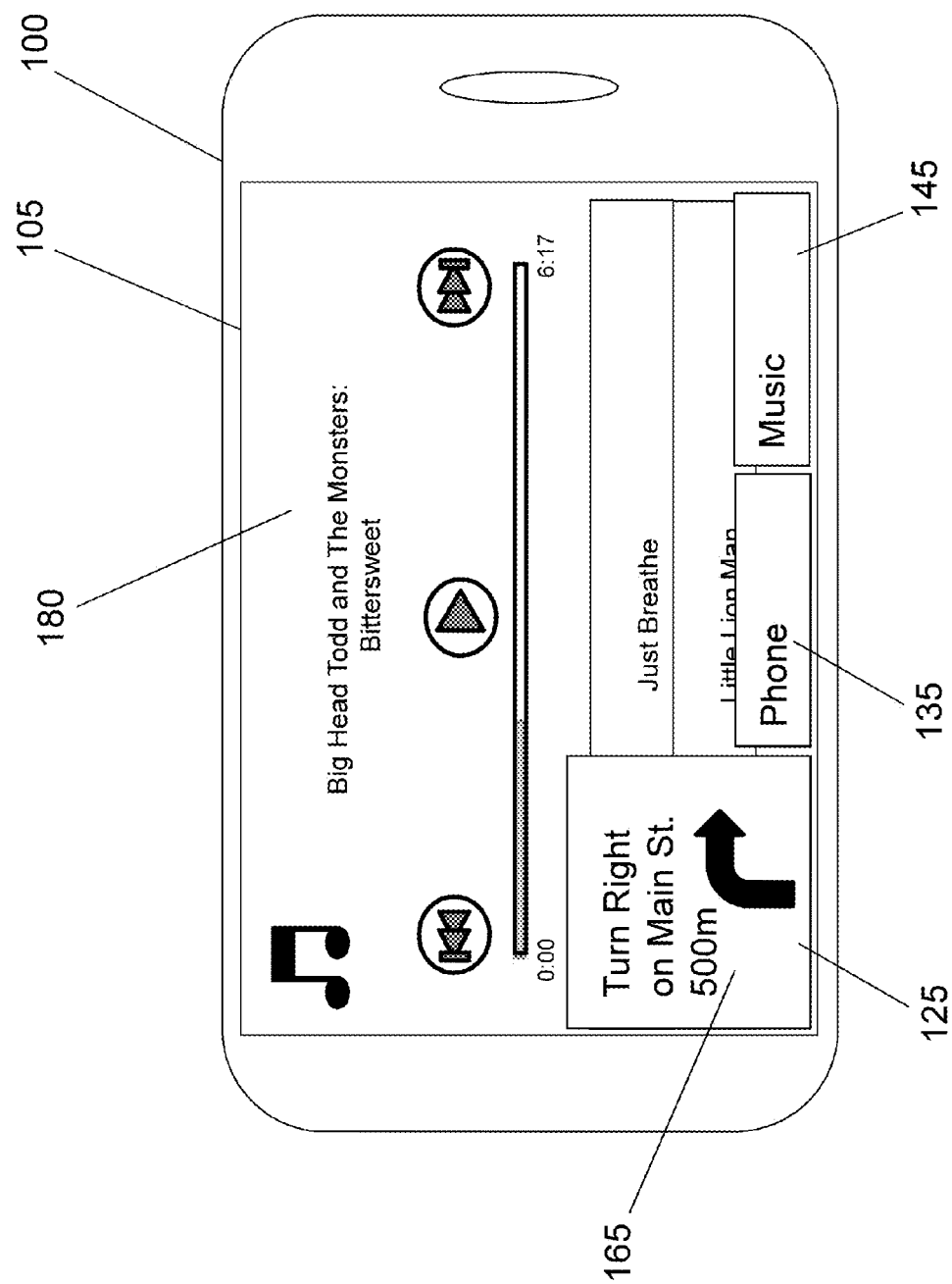
Figure 12:
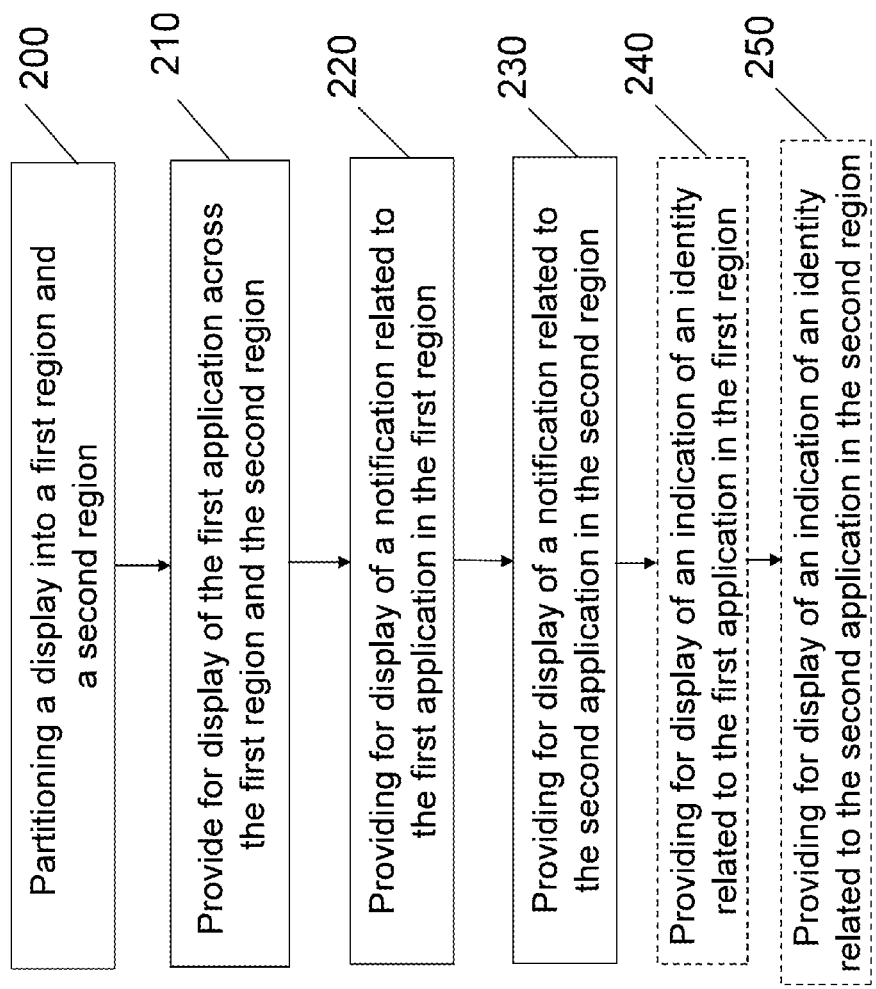

FIG. 11 is an illustration of a notification presented in an associated region over a primary application according to yet another example embodiment of the present invention; and FIG. 12 is a flowchart of a method for providing a mechanism by which multiple applications and notifications related thereto may be presented on a partitioned display according to an example embodiment of the present invention.

DETAILED DESCRIPTION

Some embodiments of the present invention will now be described more fully hereinafter with reference to the accompanying drawings, in which some, but not all embodiments of the invention are shown. Indeed, various embodiments of the invention may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information" and similar terms may be used interchangeably to refer to data capable of being transmitted, received and/or stored in accordance with some embodiments of the present invention. Thus, use of any such terms should not be taken to limit the spirit and scope of embodiments of the present invention.

Additionally, as used herein, the term 'circuitry' refers to (a) hardware-only circuit implementations (e.g., implementations in analog circuitry and/or digital circuitry); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. This definition of 'circuitry' applies to all uses of this term herein, including in any claims. As a further example, as used herein, the term 'circuitry' also includes an implementation comprising one or more processors and/or portion(s) thereof and accompanying software and/or firmware. As another example, the term 'circuitry' as used herein also includes, for example, a baseband integrated circuit or applications processor integrated circuit for a mobile phone or a similar integrated circuit in a server, a cellular network device, other network device, and/or other computing device.

As defined herein a "computer-readable storage medium," which refers to a non-transitory, physical storage medium (e.g., volatile or non-volatile memory device), can be differentiated from a "computer-readable transmission medium," which refers to an electromagnetic signal.

Devices that may benefit from example embodiments of the present invention may include portable devices, such as tablet computers, cellular telephones, portable media devices, or the like, which are enhanced by a graphical user interface presented on a display, such as a touch screen. As portability of these devices often relates to their size, a smaller size may enhance portability while potentially sacrificing the available display area. Therefore it may be desirable to optimize the display to present as much information as possible in an easily intelligible manner while providing multiple levels of interface with available programs.

Some embodiments of the present invention may relate to a provision of a mechanism by which the display of a device is partitioned in order to present information related to two or more applications in an easily distinguishable manner. A device, such as a mobile terminal, may enable operation of multiple applications simultaneously. The display of such a device may be partitioned into regions, where each region is associated with an application, or a group of applications. A primary application, which may be selected from the available applications, may be displayed across all of the regions of a display, but remains associated with a particular region. In response to receiving a notification of an application associated with one of the other regions of the display, the notification may be presented in the region corresponding to the application. In this manner, a user may readily determine the application from which a notification is received based on a region of the display that the notification is presented in. Further, the primary application which may be displayed across all of the regions may be minimally obscured by the presentation of the notification, thereby enabling a user to remain focused on the primary application.

Figure 1:
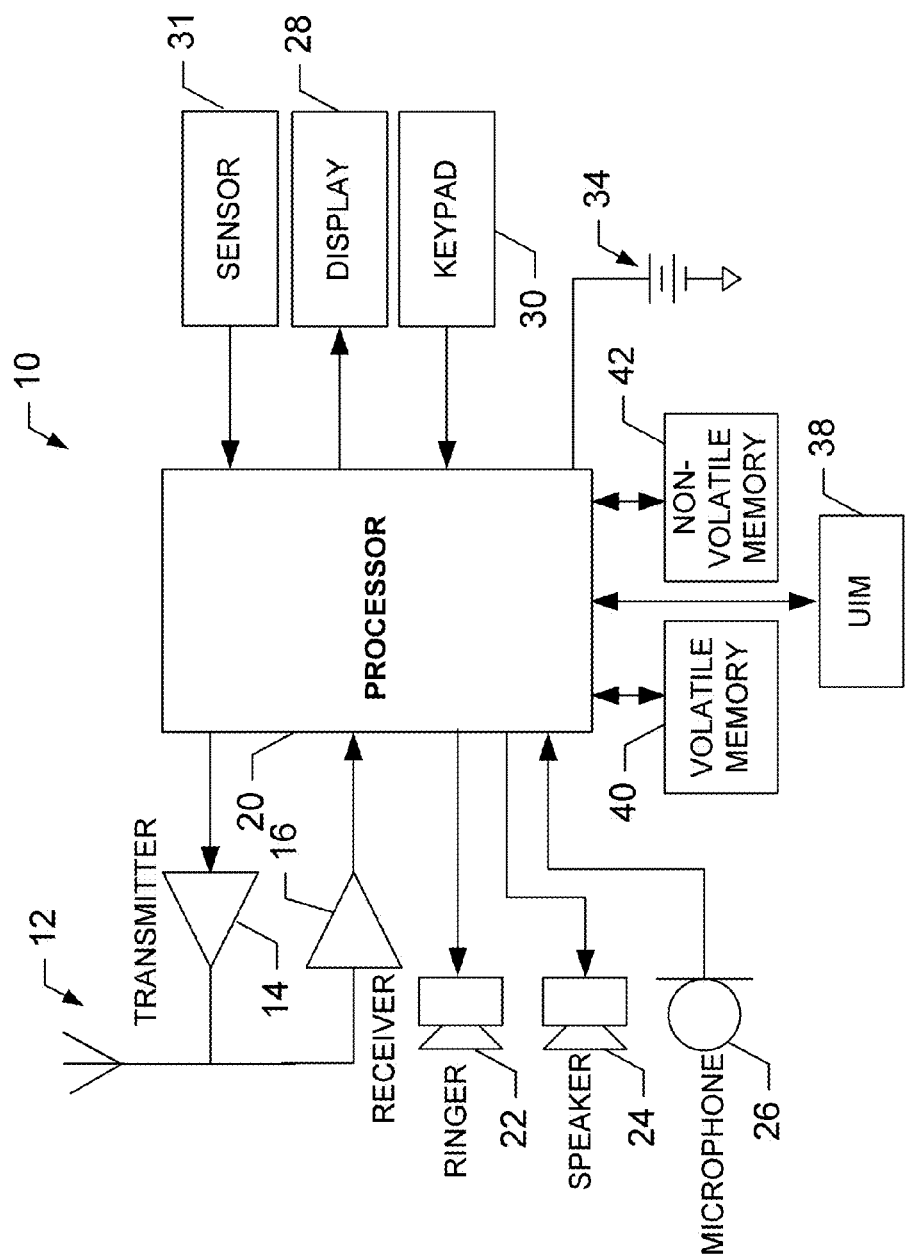
FIG. 1 is a schematic block diagram of a mobile terminal according to an example embodiment of the present invention.

One example embodiment of the invention is depicted in FIG. 1 which illustrates a block diagram of a mobile terminal 10 that would benefit from embodiments of the present invention. It should be understood, however, that the mobile terminal 10 as illustrated and hereinafter described is merely illustrative of one type of device that may benefit from embodiments of the present invention and, therefore, should not be taken to limit the scope of embodiments of the present invention. As such, although numerous types of mobile terminals, such as portable digital assistants (PDAs), mobile telephones, pagers, mobile televisions, gaming devices, laptop computers, cameras, tablet computers, touch surfaces, wearable devices, video recorders, audio/video players, radios, electronic books, positioning devices (e.g., global positioning system (GPS) devices), or any combination of the aforementioned, and other types of voice and text communications systems, may readily employ embodiments of the present invention, other devices including fixed (non-mobile) electronic devices may also employ some example embodiments.

The mobile terminal 10 may include an antenna 12 (or multiple antennas) in operable communication with a transmitter 14 and a receiver 16. The mobile terminal 10 may further include an apparatus, such as a processor 20 or other processing device (e.g., processor 70 of FIG. 2), which controls the provision of signals to and the receipt of signals from the transmitter 14 and receiver 16, respectively. The signals may include signaling information in accordance with the air interface standard of the applicable cellular system, and also user speech, received data and/or user generated data. In this regard, the mobile terminal 10 is capable of operating with one or more air interface standards, communication protocols, modulation types, and access types. By way of illustration, the mobile terminal 10 is capable of operating in accordance with any of a number of first, second, third and/or fourth-generation communication protocols or the like. For example, the mobile terminal 10 may be capable of operating in accordance with second-generation (2G) wireless communication protocols IS-136 (time division multiple access (TDMA)), GSM (global system for mobile communication), and IS-95 (code division multiple access (CDMA)), or with third-generation (3G) wireless communication protocols, such as Universal Mobile Telecommunications System (UMTS), CDMA2000, wideband CDMA (WCDMA) and time division-synchronous CDMA (TD-SCDMA), with 3.9G wireless communication protocol such as evolved UMTS Terrestrial Radio Access Network (E-UTRAN), with fourth-generation (4G) wireless communication protocols (e.g., Long Term Evolution (LTE) or LTE-Advanced (LTE-A) or the like. As an alternative (or additionally), the mobile terminal 10 may be capable of operating in accordance with non-cellular communication mechanisms. For example, the mobile terminal 10 may be capable of communication in a wireless local area network (WLAN) or other communication networks.

In some embodiments, the processor 20 may include circuitry desirable for implementing audio and logic functions of the mobile terminal 10. For example, the processor 20 may be comprised of a digital signal processor device, a microprocessor device, and various analog to digital converters, digital to analog converters, and other support circuits. Control and signal processing functions of the mobile terminal 10 are allocated between these devices according to their respective capabilities. The processor 20 thus may also include the functionality to convolutionally encode and interleave message and data prior to modulation and transmission. The processor 20 may additionally include an internal voice coder, and may include an internal data modem. Further, the processor 20 may include functionality to operate one or more software programs, which may be stored in memory. For example, the processor 20 may be capable of operating a connectivity program, such as a conventional Web browser. The connectivity program may then allow the mobile terminal 10 to transmit and receive Web content, such as location-based content and/or other web page content, according to a Wireless Application Protocol (WAP), Hypertext Transfer Protocol (HTTP) and/or the like, for example.

The mobile terminal 10 may also comprise a user interface including an output device such as a conventional earphone or speaker 24, a ringer 22, a microphone 26, a display 28, and a user input interface, all of which are coupled to the processor 20. The user input interface, which allows the mobile terminal 10 to receive data, may include any of a number of devices allowing the mobile terminal 10 to receive data, such as a keypad 30, a touch display (display 28 providing an example of such a touch display) or other input device. In embodiments including the keypad 30, the keypad 30 may include the conventional numeric (0-9) and related keys (#, *), and other hard and soft keys used for operating the mobile terminal 10. Alternatively or additionally, the keypad 30 may include a conventional QWERTY keypad arrangement. The keypad 30 may also include various soft keys with associated functions. In addition, or alternatively, the mobile terminal 10 may include an interface device such as a joystick or other user input interface. Some embodiments employing a touch display may omit the keypad 30 and any or all of the speaker 24, ringer 22, and microphone 26 entirely. Additional input to the processor 20 may include a sensor 31. The sensor 31 may include one or more of a motion sensor, temperature sensor, light sensor, accelerometer, or the like. Forms of input that may be received by the sensor may include physical motion of the mobile terminal 10, whether or not the mobile terminal 10 is in a dark environment (e.g., a pocket) or in daylight, whether the mobile terminal is being held by a user or not (e.g., through temperature sensing of a hand). The mobile terminal 10 further includes a battery 34, such as a vibrating battery pack, for powering various circuits that are required to operate the mobile terminal 10, as well as optionally providing mechanical vibration as a detectable output.

The mobile terminal 10 may further include a user identity module (UIM) 38. The UIM 38 is typically a memory device having a processor built in. The UIM 38 may include, for example, a subscriber identity module (SIM), a universal integrated circuit card (UICC), a universal subscriber identity module (USIM), a removable user identity module (R-UIM), etc. The UIM 38 typically stores information elements related to a mobile subscriber. In addition to the UIM 38, the mobile terminal 10 may be equipped with memory. For example, the mobile terminal 10 may include volatile memory 40, such as volatile Random Access Memory (RAM) including a cache area for the temporary storage of data. The mobile terminal 10 may also include other non-volatile memory 42, which may be embedded and/or may be removable. The memories may store any of a number of pieces of information, and data, used by the mobile terminal 10 to implement the functions of the mobile terminal 10.

As noted above, mobile terminals, including devices such as portable digital assistants (PDAs) and cellular telephones, are becoming smaller in size to allow for greater portability to the user. With the decrease in size of such devices, however, comes a decrease in the space available for displaying information. In other words, the size of the viewing area through which interactive content (e.g., contacts, e-mail messages, games, etc.) is presented to the user has become more limited as a result of more compact devices.

Figure 2:
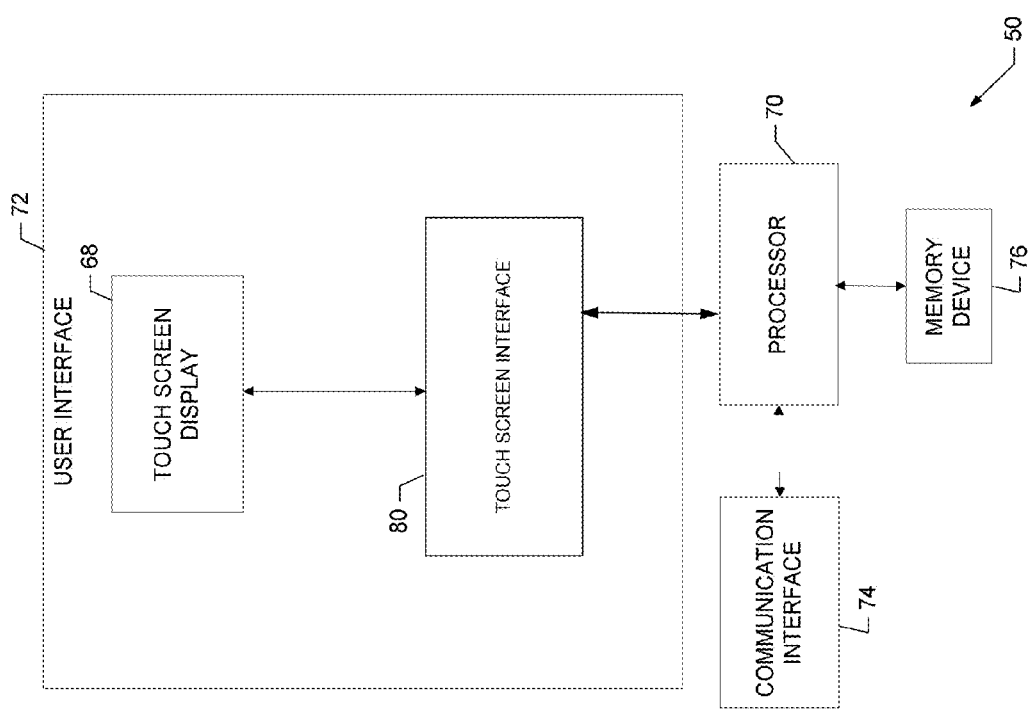
FIG. 2 is a schematic block diagram of an apparatus for providing a mechanism by which multiple applications and notifications related thereto may be presented on a partitioned display according to an example embodiment of the present invention.

An example embodiment of the present invention will now be described with reference to FIG. 2, in which certain elements of an apparatus 50 for providing a mechanism by which relevant content may be determined and/or presented are illustrated. The apparatus 50 of FIG. 2 may be embodied by or otherwise associated with a device such as mobile terminal 10 of FIG. 1. However, it should be noted that embodiments of the present invention may be embodied on any number of devices that include displays.

The apparatus 50 may, in some embodiments, be embodied by or otherwise associated with a mobile terminal (e.g., mobile terminal 10) as illustrated in FIG. 1 or a computing device configured to employ an example embodiment of the present invention. However, in some embodiments, the apparatus 50 may be embodied as a chip or chip set. In other words, the apparatus 50 may comprise one or more physical packages (e.g., chips) including materials, components and/or wires on a structural assembly (e.g., a baseboard). The structural assembly may provide physical strength, conservation of size, and/or limitation of electrical interaction for component circuitry included thereon. The apparatus 50 may therefore, in some cases, be configured to implement an embodiment of the present invention on a single chip or as a single "system on a chip." As such, in some cases, a chip or chipset may constitute means for performing one or more operations for providing the functionalities described herein.

The processor 70 may be embodied in a number of different ways. For example, the processor 70 may be embodied as one or more of various hardware processing means such as a coprocessor, a microprocessor, a controller, a digital signal processor (DSP), a processing element with or without an accompanying DSP, or various other processing circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processor 70 may include one or more processing cores configured to perform independently. A multi-core processor may enable multiprocessing within a single physical package. Additionally or alternatively, the processor 70 may include one or more processors configured in tandem via the bus to enable independent execution of instructions, pipelining and/or multithreading.

In an example embodiment, the processor 70 may be configured to execute instructions stored in the memory device 76 or otherwise accessible to the processor 70. Alternatively or additionally, the processor 70 may be configured to execute hard coded functionality. As such, whether configured by hardware or software methods, or by a combination thereof, the processor 70 may represent an entity (e.g., physically embodied in circuitry) capable of performing operations according to an embodiment of the present invention while configured accordingly. Thus, for example, when the processor 70 is embodied as an ASIC, FPGA or the like, the processor 70 may be specifically configured hardware for conducting the operations described herein. Alternatively, as another example, when the processor 70 is embodied as an executor of software instructions, the instructions may specifically configure the processor 70 to perform the algorithms and/or operations described herein when the instructions are executed. However, in some cases, the processor 70 may be a processor of a specific device (e.g., a mobile terminal or network device) adapted for employing an embodiment of the present invention by further configuration of the processor 70 by instructions for performing the algorithms and/or operations described herein. The processor 70 may include, among other things, a clock, an arithmetic logic unit (ALU) and logic gates configured to support operation of the processor 70.

Meanwhile, the communication interface 74 may be any means such as a device or circuitry embodied in either hardware or a combination of hardware and software that is configured to receive and/or transmit data from/to a network and/or any other device or module in communication with the apparatus 50. In this regard, the communication interface 74 may include, for example, an antenna (or multiple antennas) and supporting hardware and/or software for enabling communications with a wireless communication network. In some environments, the communication interface 74 may alternatively or also support wired communication. As such, for example, the communication interface 74 may include a communication modem and/or other hardware/software for supporting communication via cable, digital subscriber line (DSL), universal serial bus (USB) or other mechanisms.

The user interface 72 may be in communication with the processor 70 to receive an indication of a user input at the user interface 72 and/or to provide an audible, visual, mechanical or other output to the user. As such, the user interface 72 may include, for example, a keyboard, a mouse, a joystick, a display, a touch screen(s), touch areas, device surfaces and/or sensors capable of detecting objects hovering over the surface, soft keys, a microphone, a speaker, motion sensor, temperature sensor, accelerometer, or other input/output mechanisms. In this regard, for example, the processor 70 may comprise user interface circuitry configured to control at least some functions of one or more elements of the user interface, such as, for example, a speaker, ringer, microphone, display, and/or the like. The processor 70 and/or user interface circuitry comprising the processor 70 may be configured to control one or more functions of one or more elements of the user interface through computer program instructions (e.g., software and/or firmware) stored on a memory accessible to the processor 70 (e.g., memory device 76, and/or the like).

In an example embodiment, the apparatus 50 may include or otherwise be in communication with a display, such as the illustrated touch screen display 68 (e.g., the display 28). In different example cases, the touch screen display 68 may be a two dimensional (2D) or three dimensional (3D) display. The touch screen display 68 may be embodied as any known touch screen display. Thus, for example, the touch screen display 68 could be configured to enable touch recognition by any suitable technique, such as resistive, capacitive, infrared, strain gauge, surface wave, optical imaging, dispersive signal technology, acoustic pulse recognition, etc. techniques. The user interface 72 may be in communication with the touch screen display 68 to receive indications of user inputs at the touch screen display 68 and to modify a response to such indications based on corresponding user actions that may be inferred or otherwise determined responsive to the indications. In one alternative, a touch input may be provided other than by direct interaction with a display (e.g., in cases where the user interface is projected onto a wall with a projector, or where a cursor is used to direct input on the display).

In an example embodiment, the apparatus 50 may include a touch screen interface 80. The touch screen interface 80 may, in some instances, be a portion of the user interface 72. However, in some alternative embodiments, the touch screen interface 80 may be embodied as the processor 70 or may be a separate entity controlled by the processor 70. As such, in some embodiments, the processor 70 may be said to cause, direct or control the execution or occurrence of the various functions attributed to the touch screen interface 80 (and any components of the touch screen interface 80) as described herein. The touch screen interface 80 may be any means such as a device or circuitry operating in accordance with software or otherwise embodied in hardware or a combination of hardware and software (e.g., processor 70 operating under software control, the processor 70 embodied as an ASIC or FPGA specifically configured to perform the operations described herein, or a combination thereof) thereby configuring the device or circuitry to perform the corresponding functions of the touch screen interface 80 as described herein. Thus, in examples in which software is employed, a device or circuitry (e.g., the processor 70 in one example) executing the software forms the structure associated with such means.

The touch screen interface 80 may be configured to receive an indication of an input in the form of a touch event at the touch screen display 68. As such, the touch screen interface 80 may be in communication with the touch screen display 68 to receive indications of user inputs at the touch screen display 68 and to modify a response to such indications based on corresponding user actions that may be inferred or otherwise determined responsive to the indications. Following recognition of a touch event, the touch screen interface 80 may be configured to determine a classification of the touch event and provide a corresponding function based on the touch event in some situations. Optionally, a device may be configured to recognize a hovering input where a user may use a stylus or finger to hover over a tile or interactive element and the device may be configured to recognize the hovering as an input, for example, by using user interface 72.

Figure 3:
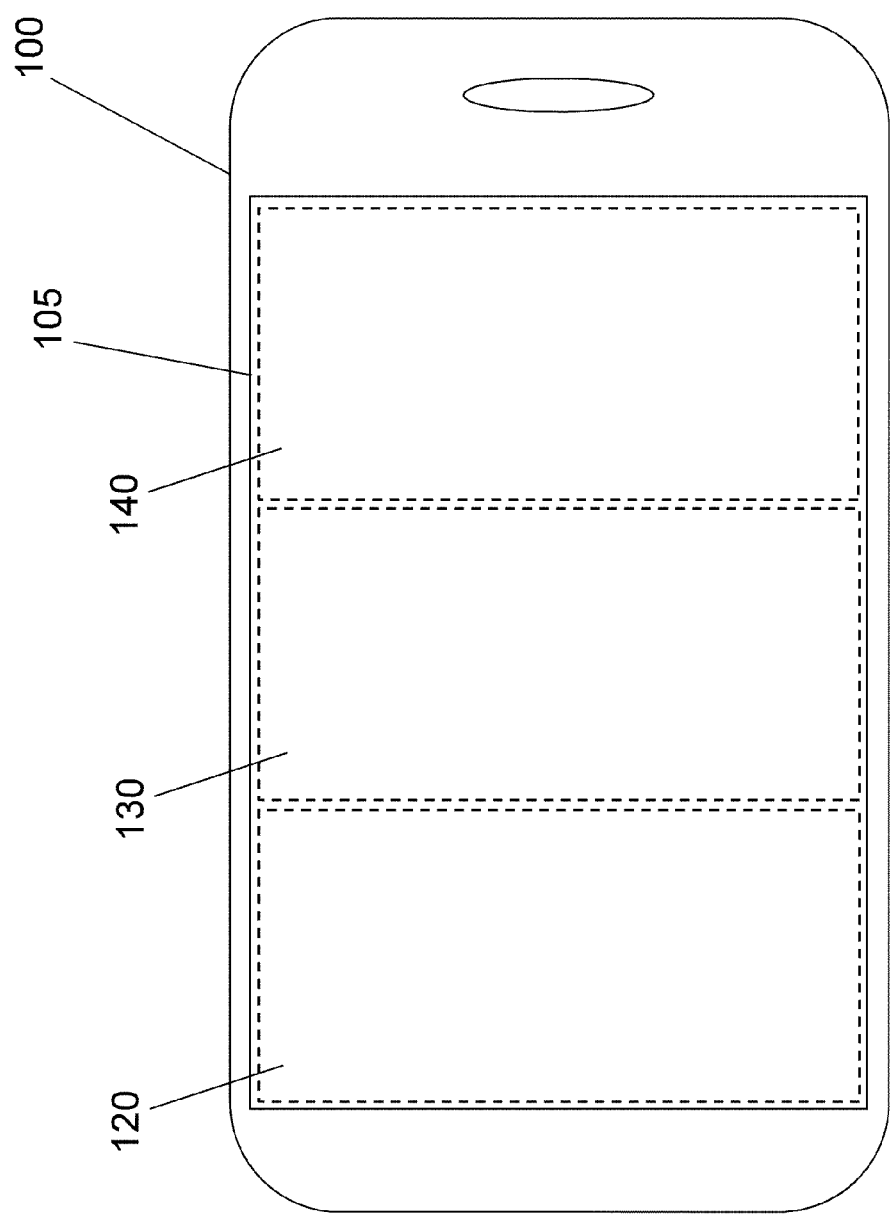
FIG. 3 is an illustration of a device with partitioned regions depicted.

FIG. 3 illustrates a device 100 for providing a mechanism by which notifications and information from various applications may be presented to a user in an easily distinguishable manner, providing the user the information associated with the notification while maintaining the primary application as the primary focus of the display. The term "application" as referred to herein can refer to any application or program operable on a device, such as a media player application, an email application, an internet browser application, a device settings application, etc. Further, an "application" may be executed by a first device or processor remote from a device on which a user interface is presented on a display, and with which a user may interact. As such, the term "application" should not be limited to the embodiments described herein with regards to the example illustrations as any number of functions of such a device may be considered an "application."

FIG. 3 depicts a device 100, such as a mobile device (e.g., mobile terminal 10), that includes a display 105 (e.g., display 28). The display may be of any known type including touch-screen displays such as the touch screen display 68 of user interface 72 of FIG. 2; however, the touch-screen functionality is not necessary to implement example embodiments of the present invention. The depicted display 105 is partitioned, (e.g., by processor 70) to include three regions 120, 130, and 140. The regions are shown outlined by a dashed line; however, the regions may not have an outline or any feature visually distinguishing the regions as the regions may be visually distinguished by the information and shape of information displayed in a region as described in detail below. Further, while the illustrated embodiment includes three regions, embodiments may include as few as two regions, or more than three regions, as will be appreciated by one of skill in the art.

Each region (120, 130, and 140) may be associated with an application, or a group of applications. Generally, an application will not be associated with more than one region.

Figure 4:
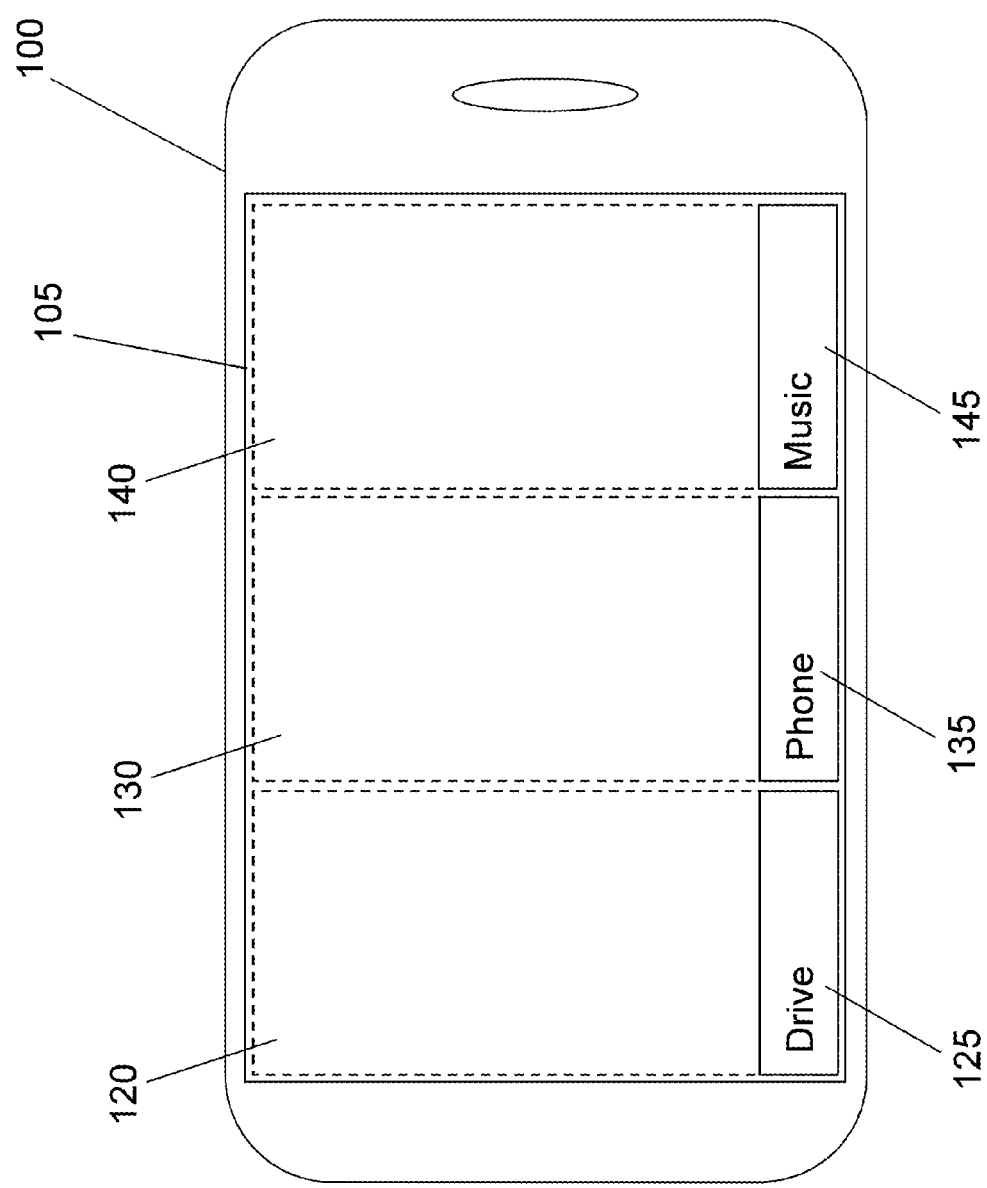
FIG. 4 is an illustration of a device with partitioned regions depicted and region indicators shown according to an example embodiment of the present invention.

FIG. 4 illustrates the device of FIG. 3 including an indication 125, 135, 145 for each of the respective regions 120, 135, 145 of the display 105. The indications 125, 135, 145 provide an indication of the identity of the application, or group of applications associated with a respective region 120, 130, 140. The presentation of the indications and the partitioning of the display 105 into a plurality of regions and, as described below, the modification, expansion and/or minimization of the regions may be provided by the processor 70 and/or the user interface 72 of the apparatus 50.

In the illustrated embodiment, region 120, including indicator 125, is associated with a group of applications with the "Drive" identifier. The identifiers may be user-configurable such that a user is enabled to name the indicator 125 and associate one or more applications with the associated region 120. For example, the region 120 with the "Drive" identifier in indicator 125 may be associated with applications related to driving, such as a navigation application, a travel information application, a hotel booking application, or a gas-station locating application, for example. The indication of the identity of the application or group of applications associated with a region may also include an icon, image, or other indication to provide a user with a visual cue as to the application or group of applications associated with the region.

FIG. 4 further illustrates indicator 135 including an identifier of "Phone". The region 130 may be associated with the phone application of the device 100 which enables a user to place or receive phone calls, such as through the receiver 16 and transmitter 14 using the speaker 24 and microphone 26 of mobile terminal 10. Optionally, other "phone" related applications may be associated with region 130, such as a voicemail application, a voice-to-text application, a ringtone selection application, etc. Region 140 of the illustrated embodiment includes an indicator with the "Music" identifier. Applications which may be associated with region 140 may include an internet radio application, a music player application which may access locally or remotely stored music, etc.

Figure 5:
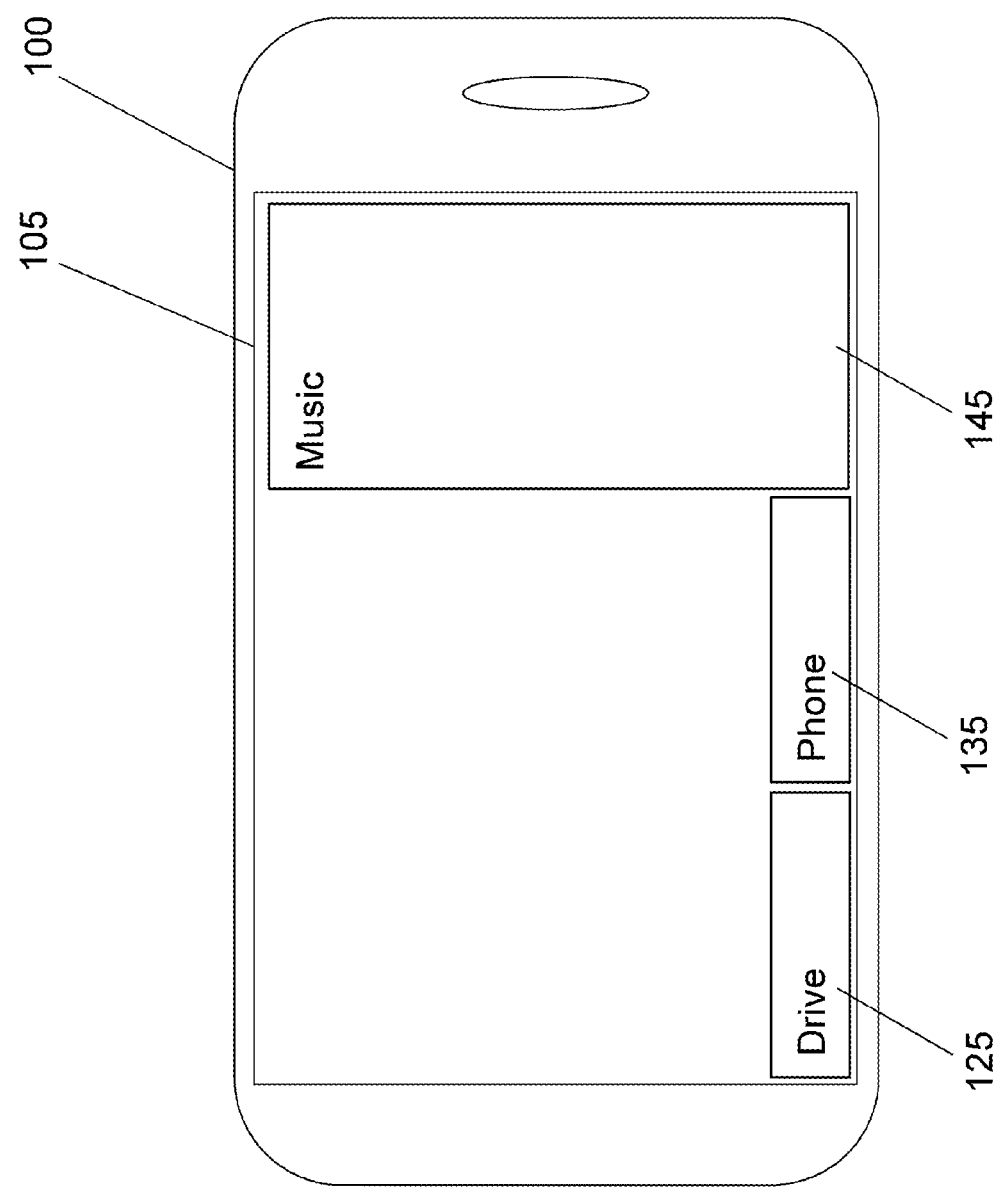
FIG. 5 is an illustration of a device presenting an expanded region indicator shown according to an example embodiment of the present invention.
Figure 6:
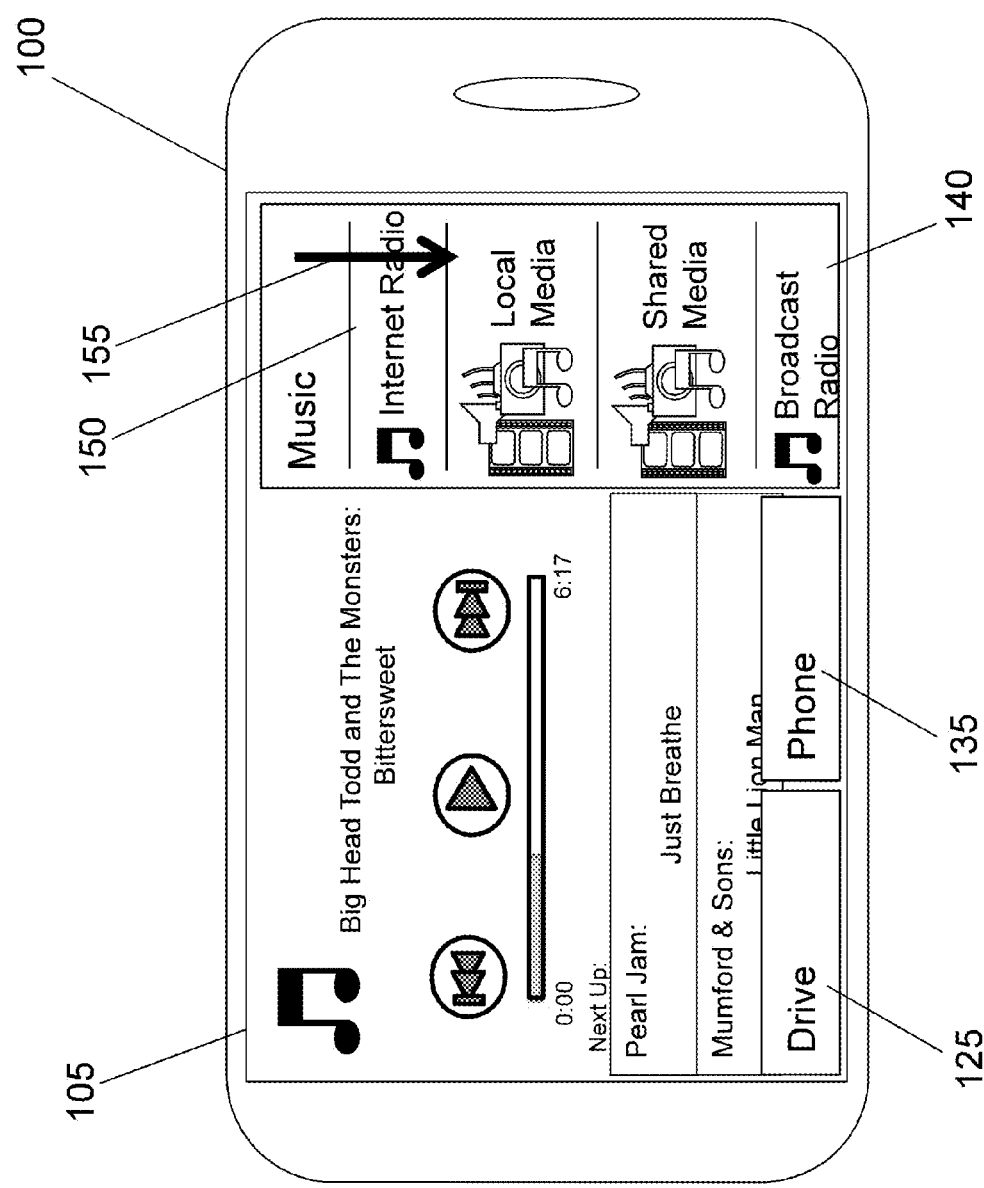
FIG. 6 is an illustration of a device presenting a primary application across multiple regions of the display according to an example embodiment of the present invention.

FIG. 5 illustrates an example embodiment of the indicator 145 for applications related to the Music identifier expanded to fill the region 140 (shown in FIG. 3) of the display 105. The indicator 145, in some instances, may be expanded, such as by the processor 70 of an apparatus 50, in response to selection by a user. For example, FIG. 6 illustrates an example embodiment of an application associated with the "Music" being selected by the user to be the "primary application." A "primary application" may be an application which is active and occupies the display 105 of the device 100, extending across some or all regions (120, 130) not associated with the primary application. The primary application may be selected by the initiation of an application through a menu selection of the application (e.g., through selection of an application identifier via user interface 72), through selection of an icon related to the application, through selection of an identifier of an application within a region, through voice activation, etc. FIG. 6 illustrates the primary application occupying the regions 120, 130 associated with the "Drive" and "Phone" identifiers 125, 135, while the region associated with the "Music" identifier includes access to other applications 150 related to the Music indicator.

Figure 7:
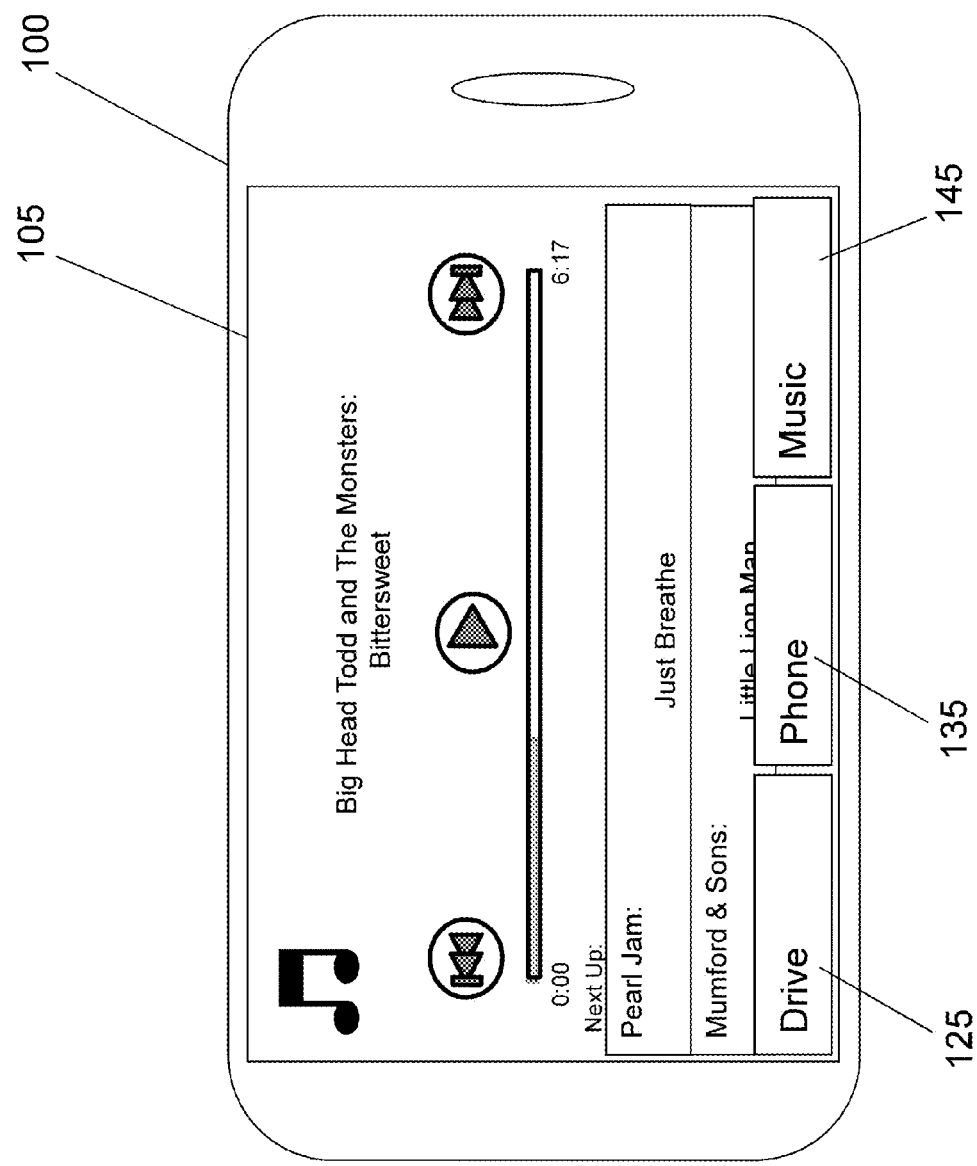
FIG. 7 is an illustration of a device presenting a primary application across all regions of the display according to an example embodiment of the present invention.

The "Music" indicator occupying the region 140 may be minimized (e.g., by dragging the identifier down, along arrow 155) such that the "Music" indicator 145 occupies only a portion of the region 140, as shown in FIG. 7. In response to the "Music" indicator 145 being minimized, the primary application may be expanded to fill the region previously occupied by the expanded indicator 145. While in the illustrated embodiment, the "Drive" 125, "Phone" 135, and "Music" 145 indicators are shown on the display 105 of FIG. 7, in some example embodiments, the indicators may not be shown or may be hidden after a period of inactivity of the indicators. For example, the indicators 125, 135, 145 may be hidden until an input is received in an area proximate the location of the display 105 where the indicators are typically displayed. The input may be a touch in the case of a touch-screen display 105. The indicators may also be shown in response to a notification being presented as described further below.

Figure 8:
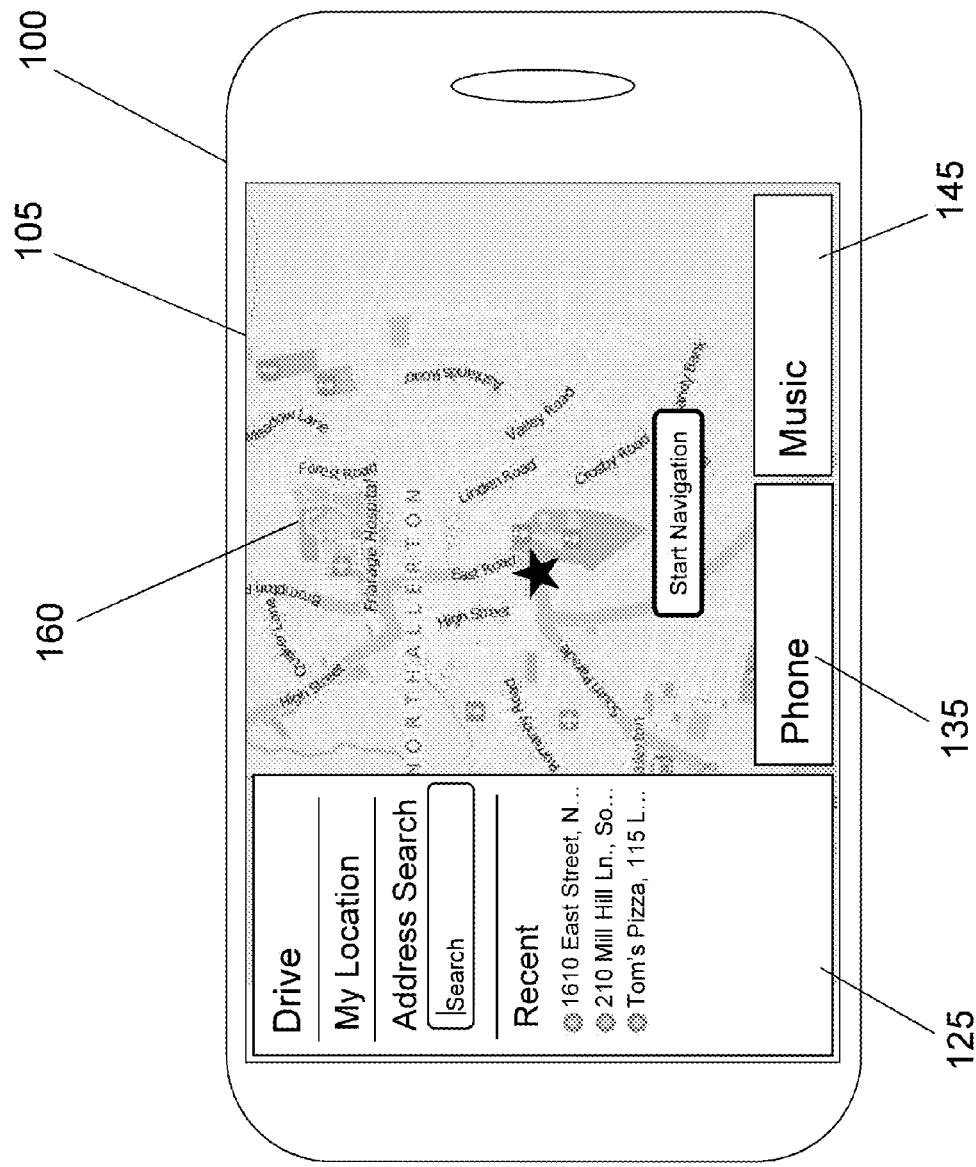
FIG. 8 is an illustration of a device presenting a primary application across multiple regions of the display according to another example embodiment of the present invention.

FIG. 8 illustrates another example embodiment of a device according to the present invention where a navigation application 160, related to the "Drive" indicator 125 is the primary application and occupies the regions 130, 140 associated with the "Phone" and "Music" indicators (as shown in FIG. 4). A menu of available functions is illustrated in the region 120 associated with the "Drive" indicator 125. The navigation application 160 may be used, for example, while a device user is driving a vehicle and uses the navigation application 160 of FIG. 8 to establish a route to a specified destination.

Figure 9:
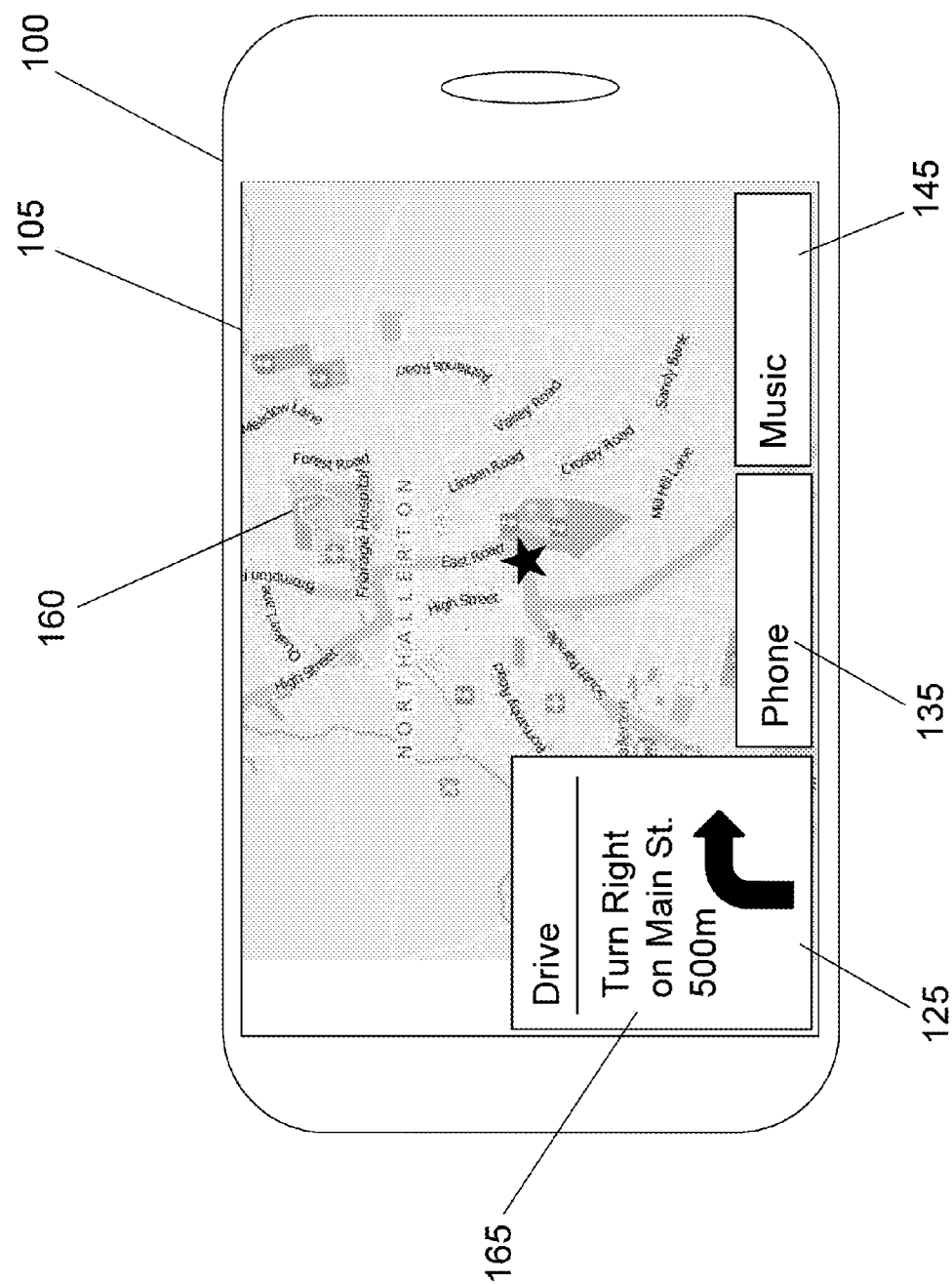
FIG. 9 is an illustration of a notification presented in an associated region over a primary application according to an example embodiment of the present invention.

In order to reduce driver distraction, navigation application notifications provided by the processor 70 and/or the user interface 72 of the apparatus 50 may provide notifications to a driver, such as turn-by-turn directions, audibly such that a driver does not need to look at the device display 105 to ascertain the next instruction. However, audible notifications may not be sufficient in some cases, or a driver may seek visual confirmation of a notification. FIG. 9 illustrates an example embodiment of a device 100 with a navigation application 160 as the primary application occupying the majority of the display 105, including regions 130, and 140 (illustrated in FIG. 3). The notification 165 may include the next turn to be made and may appear in or proximate the "Drive" indicator 125 in region 120. The notification 165 illustrated in FIG. 9 shows that the next turn is a right-turn on Main Street in 500 meters. This notification, appearing in the position of the "Drive" indicator 125, may demonstrate to a user that the notification belongs to the application (or one of the applications) associated with the "Drive" indicator.

Figure 10:
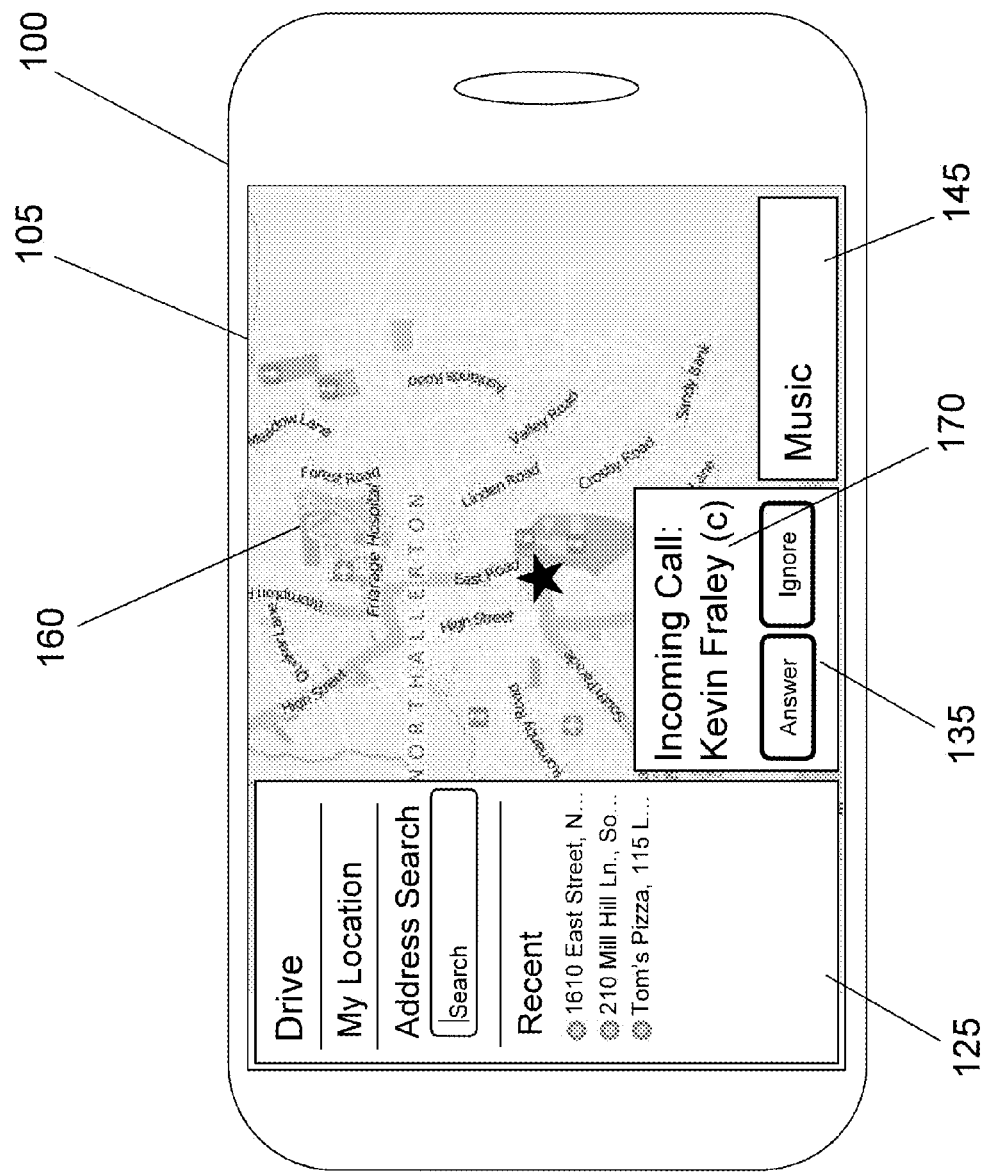
FIG. 10 is an illustration of a notification presented in an associated region over a primary application according to another example embodiment of the present invention.

FIG. 10 illustrates another example embodiment of a device 100 with a navigation application 160 as the primary application occupying the regions 130, 140 corresponding to the "Phone" and "Music" indicators 135, 145. As shown, a notification 170 has been presented on the display in the position of the "Phone" indicator 135 notifying the user of an incoming phone call. The notification may be received by the phone application of the device (e.g., via receiver 16 of the device 10 of FIG. 1) and subsequently sent from the processor 20 to the display 28 as a notification to the user. In the illustrated embodiment, the notification further includes options for responding to the notification. In the embodiment of an incoming call notification 170, the options presented may include answering the call or ignoring the call. Optionally, in response to a user failing to select either of the available options, the notification 170 may cease to be presented on the display after a predetermined period of time elapses, such as ten seconds.

As shown in FIG. 10, the "incoming call" notification 170 may minimally obscure the navigation application 160 such that a user who is relying on the navigation application, or referencing the navigation application, may still see the majority of the navigation application 160. In this manner, the incoming call notification 170 may be minimally obtrusive, minimizing the distractions of the user. Further, as the incoming call notification 170 is shown in the region 130 associated with the "Phone" indicator 135, it may be clear to a user upon a quick glance that the notification 170 is related to a phone application. This may further diminish the distractions of a user by allowing the driver to quickly determine the source of the notification without reading the details of the notification (e.g., from whom the call is).

FIG. 11 illustrates another example embodiment in which a music player application 180 is the primary application occupying at least a portion of all three regions 120, 130, and 140 of the display 105. A navigation application may be active concurrently with the music player application 180; however, with the music player application as the primary application, the navigation application may not be visible. In response to a notification from the navigation application being generated (e.g., by the processor 70 in response to receiving a current location), the notification 165 may be provided to the display 105 for presentation to a user. The notification 165 from the navigation application may appear in the region 120 associated with the "Drive" indicator 125. In this manner, a user may easily discern that the notification 165 is from an application associated with the "Drive" indicator. A user can then choose to observe the notification nor ignore the notification.

The notifications that are caused to be presented by the processor 70 and/or user interface 72 of the apparatus 50 in the regions of a respective indicator may also enable a user to change the primary application of the device. For example, in the illustrated embodiment of FIG. 11, a user may select the notification 165 from the navigation application and thereby change the primary application from the music player application 180 to the navigation application to engage the navigation application, possibly in response to the information provided in the notification 165. Optionally, a user may close the primary application, or navigate away from the primary application such that no primary application is displayed, and instead a background or "desktop" is illustrated and the indicators 125, 135, 145 may be shown over the background or desktop.

FIG. 12 is a flowchart of a method and program product according to example embodiments of the invention. It will be understood that each block of the flowchart, and combinations of blocks in the flowchart, may be implemented by various means, such as hardware, firmware, processor, circuitry and/or other device associated with execution of software including one or more computer program instructions. For example, one or more of the procedures described above may be embodied by computer program instructions. In this regard, the computer program instructions which embody the procedures described above may be stored by a memory device of a user device and executed by a processor in the user device. As will be appreciated, any such computer program instructions may be loaded onto a computer or other programmable apparatus (e.g., hardware) to produce a machine, such that the instructions which execute on the computer or other programmable apparatus create means for implementing the functions specified in the flowchart block(s). These computer program instructions may also be stored in a non-transitory computer-readable memory that may direct a computer or other programmable apparatus to function in a particular manner, such that the instructions stored in the computer-readable memory produce an article of manufacture which implements the functions specified in the flowchart block(s). The computer program instructions may also be loaded onto a computer or other programmable apparatus to cause a series of operations to be performed on the computer or other programmable apparatus to produce a computer-implemented process such that the instructions which execute on the computer or other programmable apparatus implement the functions specified in the flowchart block(s).

Accordingly, blocks of the flowchart support combinations of means for performing the specified functions and combinations of operations for performing the specified functions. It will also be understood that one or more blocks of the flowchart, and combinations of blocks in the flowchart, can be implemented by special purpose hardware-based computer systems which perform the specified functions, or combinations of special purpose hardware and computer instructions.

In this regard, a method according to one embodiment of the invention, as shown in FIG. 12, may include partitioning a display into a first region and a second region as shown at 200. The first region may be associated with a first application and the second region associated with a second application. The first application may be provided for display across the first region and the second region at 210. A notification related to the first application may be presented in the first region at 220. A notification related to the second application may be presented in the second region at 230.

In some embodiments, certain ones of the operations above may be modified or further amplified as described below. Moreover, in some embodiments additional optional operations may also be included. It should be appreciated that each of the modifications, optional additions or amplifications below may be included with the operations above either alone or in combination with any others among the features described herein. With reference to the method of FIG. 12, in some example embodiments, an indication of an identity related to the first application may be provided for display in the first region as shown at 240. An indication of an identity related to the second application may be provided for display in the second region as shown at 250.

In an example embodiment, an apparatus for performing the method of FIG. 12 above may comprise a processor (e.g., the processor 70) configured to perform some or each of the operations (200-250) described above. The processor 70 may, for example, be configured to perform the operations (200-250) by performing hardware implemented logical functions, executing stored instructions, or executing algorithms for performing each of the operations. Alternatively, the apparatus may comprise means, such as the processor 70, the processor 70 and memory 76 storing computer program code, a computer program product or the like, for performing each of the operations described above.

An example of an apparatus according to an example embodiment may include at least one processor and at least one memory including computer program code. The at least one memory and the computer program code may be configured to, with the at least one processor, cause the apparatus to perform the operations 200-250 (with or without the modifications and amplifications described above in any combination).

An example of a computer program product according to an example embodiment may include at least one computer-readable storage medium having computer-executable program code portions stored therein. The computer-executable program code portions may include program code instructions for performing operations 200-250 (with or without the modifications and amplifications described above in any combination).

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe some example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. A method comprising:
partitioning, by a processor, a display into a plurality of regions comprising at least a first region and a second region, wherein the first region is associated with a first group of applications of a first application type and the second region is associated with a second group of applications of a second application type, wherein the first and second application types are different from one another;
providing for display of an indicator of an identity of the first group of applications in the first region along an edge of the display;
providing for display of an indicator of an identity of the second group of applications in the second region along the edge of the display;
providing for display of a first application from the first group of applications to appear superimposed over the plurality of regions;
providing for display of a notification related to the first application of the first group of applications in only the first region, wherein the notification related to the first application of the first group of applications automatically extends from the indicator of the identity of the first group of applications away from the edge of the display toward an opposite edge of the display into the first region in response to being received wherein the notification related to the first application moves or replaces the indicator of the identity of the first group of applications; and
providing for display of a notification related to a second application of the second group of applications in only the second region, wherein the notification related to the second application of the second group of applications automatically extends from the indicator of the identity of the second group of applications away from the edge of the display toward an opposite edge of the display into the second region to appear superimposed over the first application in response to being received, and wherein the notification related to the second application moves or replaces the indicator of the identity of the second group of applications.

2. The method of claim 1, wherein providing for display of the first application across the plurality of regions comprises providing for display of the first application across the plurality of regions in response to receiving a selection of the first application as a primary application.

3. The method according to claim 2, wherein providing for display of a notification related to the second application in the second region comprises providing for display of a notification to appear superimposed over the primary application in the second region.

4. The method of claim 1, further comprising:
providing for display of the second application across the plurality of regions in response to the second application being selected as a primary application.

5. An apparatus comprising at least one processor and at least one memory including computer program code, the at least one memory and the computer program code configured to, with the at least one processor, cause the apparatus to:
partition a display into a plurality of regions comprising at least a first region and a second region, wherein the first region is associated with a first group of applications of a first type and the second region is associated with a second group of applications of a second application type, wherein the first and second application types are different from one another;
provide for display of an indicator of an identity of the first group of applications in the first region along an edge of the display;
provide for display of an indicator of an identity of the second group of applications in the second region along the edge of the display;
provide for display of a first application from the first group of applications to appear superimposed over the plurality of regions;
provide for display of a notification related to the first application of the first group of applications in only the first region, wherein the notification related to the first application of the first group of applications automatically extends from the indicator of the identity of the first group of applications away from the edge of the display toward an opposite edge of the display into the first region in response to being received wherein the notification related to the first application moves or replaces the indicator of the identity of the first group of applications; and
provide for display of a notification related to a second application of the second group of applications in only the second region, wherein the notification related to the second application of the second group of applications automatically extends from the indicator of the identity of the second group of applications away from the edge of the display toward an opposite edge of the display into the second region to appear superimposed over the first application in response to being received, and wherein the notification related to the second application moves or replaces the indicator of the identity of the second group of applications.

6. The apparatus of claim 5, wherein causing the apparatus to provide for display of the first application across the plurality of regions comprises causing the apparatus to provide for display of the first application across the plurality of regions in response to receiving a selection of the first application as a primary application.

7. The apparatus according to claim 6, wherein causing the apparatus to provide for display of a notification related to the second application in the second region comprises causing the apparatus to provide for display of a notification to appear superimposed over the primary application in the second region.

8. The apparatus of claim 5, wherein the apparatus is further caused to provide for display of the second application across the plurality of regions in response to the second application being selected as a primary application.

9. A computer program product comprising at least one non-transitory computer-readable storage medium having computer executable program code instructions stored therein, the computer executable program code instructions comprising:

program code instructions to partition a display into a plurality of regions comprising at least a first region and a second region wherein the first region is associated with a first group of applications of a first application type and the second region is associated with a second group of applications of a second application type, wherein the first and second application types are different from one another;

program code instructions to provide for display of an indicator of an identity of the first group of applications in the first region along an edge of the display;

program code instructions to provide for display of an indicator of an identity of the second group of applications in the second region along the edge of the display;

program code instructions to provide for display of a first application from the first group of applications to appear superimposed over the plurality of regions;

program code instructions to provide for display of a notification related to the first application of the first group of applications in only the first region, wherein the notification related to the first application automatically extends from the indicator of the identity of the first group of applications away from the edge of the display toward an opposite edge of the display into the first region in response to being received wherein the notification related to the first application moves or replaces the indicator of the identity of the first group of applications; and program code instructions to provide for display of a notification related to a second application of the second group of applications in only the second region, wherein the notification related to the second group of applications automatically extends from the indicator of the identity of the second group of applications away from the edge of the display toward an opposite edge of the display into the second region to appear superimposed over the first application in response to being received, and wherein the notification related to the second application moves or replaces the indicator of the identity of the second group of applications.

10. The computer program product of claim 9, wherein the program code instructions to provide for display of the first application across the plurality of regions comprises computer program code to provide for display of the first application across the plurality of regions in response to receiving a selection of the first application as a primary application.

11. The computer program product of claim 9, further comprising:

program code instructions to provide for display of the second application across the plurality of regions in response to the second application being selected as the primary application.

12. The method of claim 1, wherein in response to the notification related to the first application replacing the indicator of the identity of the first application, an identity of the first group of applications ceases to be shown in the first region.

13. The apparatus of claim 5, wherein in response to the notification related to the first application replacing the indicator of the identity of the first application, an identity of the first group of applications ceases to be shown in the first region.

14. The computer program product of claim 9, wherein in response to the notification related to the first application replacing the indicator of the identity of the first application, an identity of the first group of applications ceases to be shown in the first region.

15. The method of claim 1, wherein the applications of the first group of applications are each related to navigation, and wherein the applications of the second group of applications are each related to music.

16. The method of claim 1, wherein a first notification presented only in the first region is associated with the first application of the first group of applications and a second notification presented only in the first region is associated with a second application of the first group of applications.

* * * * *